United States Patent [19]
Schadt et al.

[11] Patent Number: 6,160,597
[45] Date of Patent: *Dec. 12, 2000

[54] OPTICAL COMPONENT AND METHOD OF MANUFACTURE

[75] Inventors: Martin Schadt, Seltisberg, Switzerland; Andreas Schuster, Freiburg; Hubert Seiberle, Rümmingen, both of Germany

[73] Assignee: Rolic AG, Basel, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/721,509

[22] Filed: Sep. 26, 1996

Related U.S. Application Data

[63] Continuation-in-part of application No. 08/194,234, Feb. 10, 1994, Pat. No. 5,602,661.

[30] Foreign Application Priority Data

Jun. 24, 1994 [CH] Switzerland .............................. 2016/94

[51] Int. Cl.[7] .................................................. G02F 1/1335
[52] U.S. Cl. .................................................................. 349/98
[58] Field of Search ................................................ 349/98

[56] References Cited

U.S. PATENT DOCUMENTS

| | | |
|---|---|---|
| 4,615,962 | 10/1986 | Garito . |
| 4,617,371 | 10/1986 | Blumstein et al. . |
| 4,637,896 | 1/1987 | Shannon . |
| 4,696,990 | 9/1987 | Noonan et al. . |
| 4,974,941 | 12/1990 | Gibbons et al. . |
| 5,024,850 | 6/1991 | Broer et al. . |
| 5,138,010 | 8/1992 | Keller et al. . |
| 5,202,053 | 4/1993 | Shannon . |
| 5,325,218 | 6/1994 | Willett et al. . |
| 5,389,698 | 2/1995 | Chigrinov et al. . |
| 5,464,669 | 11/1995 | Kang et al. . |

FOREIGN PATENT DOCUMENTS

| | | |
|---|---|---|
| 331 233 | 2/1989 | European Pat. Off. . |
| 336 321 | 10/1989 | European Pat. Off. . |
| 397 263 | 11/1990 | European Pat. Off. . |
| 525 473 | 7/1992 | European Pat. Off. . |
| 525 478 | 7/1992 | European Pat. Off. . |
| 543 678 | 5/1993 | European Pat. Off. . |
| 569 809 | 11/1993 | European Pat. Off. . |
| 611 981 | 2/1994 | European Pat. Off. . |

OTHER PUBLICATIONS

Derwent Abstract No. AN–93–037877/05.
Derwent Abstract No. AN–93–037882/05.
Derwent Abstract No. AN–94–265517/33.
Geibel, K. et al., Advanced Materials, 5(2):107–109 (1993).
Hikmet, R.A.M., J. Appl. Phys., 70(3):1265–1269 (1991).
Shannon, P.J., et al., Nature, 368–532–533 (1994).
Research Disclosure No. 337, Emsworth, GB, pp. 410–411 (May 1992).

*Primary Examiner*—James A. Dudek
*Attorney, Agent, or Firm*—Finnegan, Henderson, Farabow, Garrett & Dunner, L.L.P.

[57] ABSTRACT

An optical component having a hybrid layer structure includes an orienting layer, a further layer in contact with the orienting layer and incorporating a cross-linked liquid crystalline monomer and at least one additional orienting layer on top of the liquid crystalline layer, and preferably includes one additional cross-linked liquid crystalline monomer. The layers have different functions, such as orienting or retarding. At least one of the orienting layers should be a photo-orientating polymer network layer, or have locally varying orienting pattern. These optical components are useful in transmittance and reflective liquid crystal displays, such as rotation cells, STN cells, ferroelectric cells, and cells having an addressable active matrix. Such cells are useful in optical and integrated optical devices, and may be used for safeguarding against counterfeiting and copying in transmission.

4 Claims, 2 Drawing Sheets

OPTICAL COMPONENT AND METHOD OF MANUFACTURE

This application is a continuation-in-part of application Ser. No. 08/194,234, filed on Feb. 10, 1994, now U.S. Pat. No. 5,602,661.

BACKGROUND OF THE INVENTION

1. Field

The invention is concerned with the manufacture of an anisotropic layer of cross-linked liquid crystalline monomers (LCP) in contact with an orientating layer on a single substrate, and with optical components having a layered structure comprising an orientating layer, a LCP layer, and at least one additional orientating layer over the LCP layer on a single substrate and their preferred use.

2. Description

Anisotropic transparent or colored cross-linked polymer layers with three-dimensional orientation of the optical axis, either uniform or preset at individual places, are of great interest in many sectors of display technology, integrated optics, etc.

For some years, substances having this property have become known, namely certain cross-linkable liquid crystalline diacrylates and diepoxides. These substances as monomers, that is before cross-linking, can be orientated in the liquid crystalline phase in sandwich cells consisting of, for example, glass plates having an interposed monomer layer with the aid of conventional orientating layers on the two glass plate surfaces or under the influence of external fields, such as strong magnetic or electric fields. In a second phase, the monomer layer can be photo-cross-linked in the cells such that the wall forces acting on the two sides of the monomer layer, or the applied fields, preserve the preset orientation during the cross-linking process.

These external mechanical, electrical or magnetic forces prevent thermodynamic orientation relaxation inherent in liquid crystals and counteract the de-orientating forces of conventional cross-linking processes. In the absence of these external forces a de-orientation or a re-orientation of the liquid crystals usually takes place. The re-orientation from planar to perpendicular at the interface to the atmosphere opposite the substrate surface has been shown in the case of single substrates, see Hikmet and de Witz, *J. Appl. Phy.* 0:1265–1269 (1 991). (Throughout the specification, documents have been identified. The contents of each of these documents are herein incorporated by reference).

Layer structures of liquid crystalline polymers are known, see EP-A-331 233. They are manufactured by orientating a monomer layer in a cell with a voltage applied to the cell plates and then irradiating in a partial region through a mask. By so doing, cross-linking is initiated in the irradiated region only. Subsequently, the direction of the external field is changed and the monomer regions which have not yet been cross-linked are re-orientated with respect to the new field direction. Thereupon, the latter region is also illuminated and thus cross-linked. Clearly, this method cannot yield an orientating structure with high local resolution, since the radical cross-linking reaction, owing to the shading of the mask, does not have sharp boundaries. Further, this method is invariably limited to the use of sandwich cells for orientating the layer structure in an electric field.

Recently, there have become known methods which permit the production of orientating layers with locally variable orientating properties. The orientation of dichroic dye molecules incorporated in the polymer with the aid of photo-lithographic methods is described in U.S. Pat. No. 4,974,941, the contents of which are herein incorporated by reference.

The orientability and photo-structurability of a liquid crystalline monomer layer in a sandwich cell, the two surfaces of which have been photo-orientated by the laser orientation process described in U.S. Pat. No. 4,974,941, has also recently become known. This process is also limited to orientation of the monomer layer in a cell. The orientation impressed by the cell surfaces is frozen by subsequent conventional photopolymerization of the liquid crystalline monomer layer in the cell. In order to obtain a coated single substrate, the cell must be dismantled after the polymerization (P. J. Shannon, W. M. Gibbons, S. T. Sun, *Nature*, 3:532 (1 994)).

The production of optical strongly anisotropic layers consisting of orientated liquid crystal polymers in cells is also known from Research Disclosure No. 337, May 1992, Emsworth, G B, pages 410–411. There, the manufacture of such layers by placing the liquid crystal monomer in the cell, orientating by means of the two cell walls via rubbed polyimide surfaces of the cell and subsequent conventional photopolymerization in the cell is described. Further, it is mentioned that one of the two glass plates can be removed after the polymerization step in order to thereby obtain a single glass substrate coated with LC polymer. This orientated substrate can, moreover, be provided with a polyimide layer having a new direction of orientation (by rubbing).

After again assembling the thus-prepared polymer substrate in a second orientated sandwich cell, filling this cell with a further monomer layer and subsequent conventional photopolymerization, the optical pitch differences of the two differently oriented LC polymer layers in the cell are added or subtracted.

Since the rubbing of the polyimide layers on the cell surfaces is a macroscopic process, no orientation pattern can be produced with this process, the cells being uniformly orientated over the entire surface. Further, it is extremely time consuming and expensive for the manufacturer of cells having precise plate separations for the realization of uniform optical pitch differences (in the ten nanometre range).

Where, optical retarder layers are required on a single substrate, the manufacture requires, as described in Shannon et al., dismantling the cell. In so doing, the retarder layer must not be damaged. This complicates the manufacturing process rendering it impractical, especially in the case of large substrate areas as are required for high-information computers and TV-LCDs.

Layer structures comprising a film of cross-linked liquid crystalline monomers in contact with an orientating layer of a photo-orientable polymer network (PPN) are described in European Application No. 0 611 981, published Aug. 24, 1994. The manufacture of these layer structures is effected by planar orientation of the liquid crystalline monomers by interaction with the PPN layer and fixing the orientation in a subsequent cross-linking step. Cross-linked liquid crystalline monomers are also referred to as LCPs (liquid crystal polymers) in the following text.

It has now surprisingly been found that liquid crystalline monomer layers can also be applied to and cross-linked on single substrate surfaces which already contain a LCP layer. For this purpose, neither a further orientating counter-substrate of a sandwich cell is required nor are magnetic fields or electric fields necessary for the orientation. This contrasts with EP-A-0 397 263, in which magnetic field orientation of dichroic dyes in a single LC monomer layer for the manufacture of a polarizing film is indicated as being preferred and is actually the sole exemplified process (field-free orientation is, indeed, claimed, but not demonstrated).

Furthermore, it has surprisingly been found that the orientation of these monomer layers on a single substrate is not influenced or destroyed by subsequent polymerization or photo-cross linking. Thus, it is for the first time possible to-manufacture on single LCP-orientated substrate surfaces in a simple sequential manner solid films consisting of several orientated liquid crystalline polymer layers. Further, additional layers having different optical and/or electrical functions can be integrated in these complex hybrid layers. This offers for the first time the possibility of realizing not only known but also novel optical components such as polarization-interference filters, optical retarders, polarizers, etc. on single substrates by means of LCPs and to combine and to integrate these components in hybrid layers. Further, additional functional layers such as orientating layers for liquid crystals can be integrated in the hybrid layers.

The present invention provides and opens up new possibilities for optical and electro-optical components and devices using layer structures of the aforementioned kind.

SUMMARY OF THE INVENTION

The invention provides a process for making an isotropic layer of cross-linked liquid crystalline monomers in contact with an orientating layer on a single substrate. This process comprises applying an orientating layer onto a single substrate, then applying a layer of a non-cross-linked liquid crystalline monomer, and subsequently cross-linking the monomer. Also provided is an optical component having a layer structure. The component comprises a substrate, a first orientating layer, a liquid crystalline monomer layer, and a second orientating layer. The first and second orientating layers are located on opposite sides of the crystalline monomer layer. At least one of the orientating layers includes a photo-orientating polymer network.

The manufacture in accordance with the invention of an anisdtropic layer of cross-linked liquid crystalline monomers (LCP) in contact with an orientating layer comprises applying an orientating layer on a single substrate and applying to this a layer of a non-cross-linked liquid crystalline monomer and subsequently cross-linking the monomer. For the manufacture of more complex layer structures, additional orientating and liquid crystal layers can be applied in further steps and these layers can be cross-linked. Moreover, if desired, optically isotropic de-coupling layers or electrically conducting layers can be inserted or applied between individual LCP layers under the following orientating layers.

The optical component according to the invention is characterized in that at least one of the orientating layers is a layer of a photo-orientating polymer network (PPN) or has a local varying orientating pattern.

Preferably, use is made of monomer mixtures which have nematic, cholesteric, ferroelectric or non-linear optical (NLO) activity at room temperature.

The second and other LCP layers can also be applied directly, i.e. without intermediate PPN layers, to the first LCP layer and subsequently cross-linked. Thereby, the monomers in the second and subsequent layers take over the preferred orientation of the first or respective underlying LCP layers.

It will be appreciated that the PPN and LCP layers need not cover the entire surface of the substrate, but can cover all or part of the surface in individual and varying manner.

These multi-layer structures are used in optical and electro-optical devices, particularly in the manufacture of liquid crystal cells in which the various LCP layers serve different optical and orientating purposes. They are also used in integrated optical devices, e.g. in strip waveguides, Mach-Zender interferometers and frequency-doubling waveguide arrangements. Finally, these layer structures can be used as a safeguard against counterfeiting and copying.

BRIEF DESCRIPTION OF THE FIGURES

Embodiments of the invention will be described hereinafter with reference to the accompanying simplified diagrammatic drawings in which.

DETAILED DESCRIPTION OF THE INVENTION

The subject invention will now be described in terms of its preferred embodiments. These embodiments are set forth to aid in understanding the invention, but are not to be construed as limiting.

The invention provides a process for making an isotropic layer of cross-linked liquid crystalline monomers in contact with an orientating layer on a single substrate. This process comprises applying an orientating layer onto a single substrate, then applying a layer of a non-cross-linked liquid crystalline monomer, and subsequently cross-linking the monomer. Also provided is an optical component having a layer structure. The component comprises a substrate, a first orientating layer, a liquid crystalline monomer layer, and a second orientating layer. The first and second orientating layers are located on opposite sides of the crystalline monomer layer. At least one of the orientating layers includes a photo-orientating polymer network.

Figure 1:
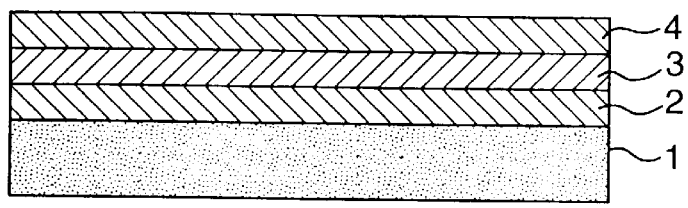
FIG. 1 shows a layer structure of an optical component according to the invention.

FIG. 1 is a diagrammatic section through a layer structure in one embodiment of the invention, showing a substrate 1 of transparent or reflecting material such as glass, polymer, metal, paper, etc. A layer 2 of a photo-orientated polymer network is disposed on the substrate and either covers the entire substrate uniformly or has varying local planar orientation. The layer can be made, for example, of cinnamic acid derivatives which are described and published in European Patent Applications Nos. 0 525 477 and 0 525 478.

The layer is orientated and simultaneously cross-linked by selective irradiation with linear polarized UV light.

Instead of the PPN layer, the layer 2 can also be a conventional orientating layer, for example a polyimide layer rubbed in one direction or a layer having an orientating effect and obtained by oblique sputtering with $SiO_x$. In this case, the orientating layer will usually have uniform orientation over the entire substrate surface. In applications where uniform orientation over the entire surface is desired, this mechanical alternative may be less expensive to manufacture than a PPN layer.

The PPN layer 2 can, in turn, be applied to a conventionally orientated layer previously deposited on the substrate 1, e.g. an obliquely sputtered $SiO_x$ layer or a uniformly rubbed polymer layer.

The layer 2 is adjacent an anisotropic layer 3 of orientated cross-linked liquid crystal monomers. The layer 3 has an arrangement of molecules having an orientation determined by the orientation of the underlying layer 2 or transferred therefrom to the liquid crystal layer. The LCP layer 3 is photo cross-linked by the action of light of suitable wavelength and retains the orientation of molecules predetermined by the layer 2. The photo cross-linking fixes the orientation of the LCP layer 3 so that it is unaffected by extreme external influences such as light or high temperatures. Even optical or thermal instabilities occurring in the course of time in the PPN layer 2 will not adversely influence the orientating properties of the LCP layer 3 after cross-linking.

Figure 2:
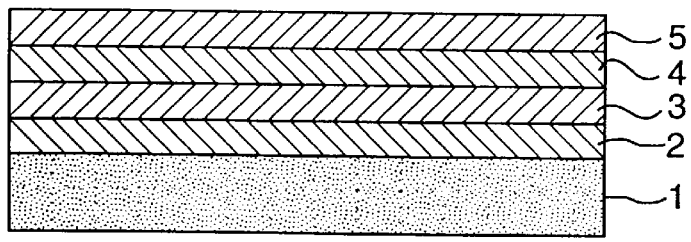
FIG. 2 shows a layer structure of an optical component with an additional layer.

The LCP layer 3 is adjacent another orientating layer which, as before, is either a PPN layer or a conventional orientating layer depending on whether locally varying orientation patterns or a uniform orientation for an adjacent second LCP layer 5 according to FIG. 2 is desired. The LCP layer 5 is produced in the same manner and has the same properties as the layer 3, but the two LCP layers are usually differently orientated.

Figure 3:
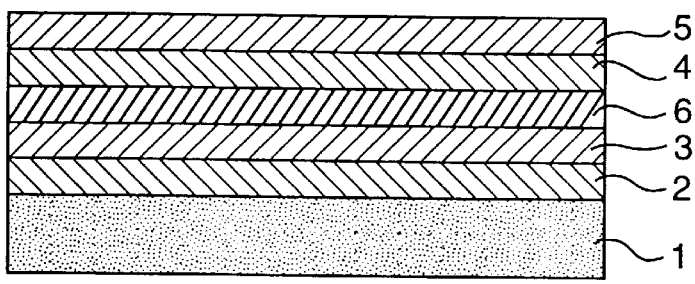
FIG. 3 shows an alternative layer structure with an additional de-coupling layer.

FIG. 3 shows an embodiment of a component in which, as in the previously described case, two LCP layers with respective orientation layers are disposed on a substrate 1. In contrast to the embodiment in FIG. 2, however, an optically isotropic or weakly anisotropic de-coupling layer 6 is disposed between the lower LCP layer 3 and the upper orientating layer 4 to prevent the LCP layer 3 exerting an orientating influence, which it of course also can have as a retarder layer, on the, upper hybrid layers 4, 5 and consequently on a liquid crystal disposed above the layer 5. The de-coupling layer 6 can be made, for example, of silicon oxides ($SiO_x$) or isotropic polymers such as polyvinyl alcohol (PVA) or nylon.

Figure 4:
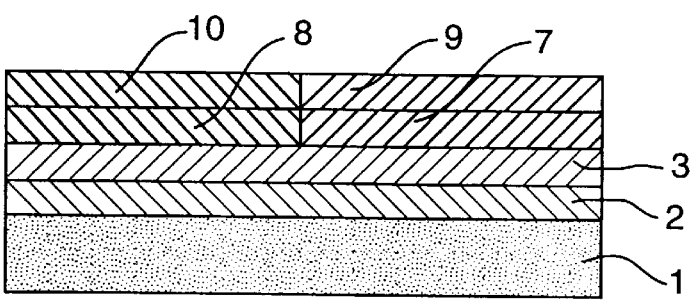
FIG. 4 shows another layer structure with locally varying orientation of component regions.

FIG. 4 shows a layer structure which, like FIG. 2, consists of four layers superposed on a substrate 1, i.e. a first PPN layer 2, a first LCP layer 3, an additional PPN layer and an additional LCP layer. In contrast to the arrangement according to FIG. 2, however, the two upper layers have different local orientations. The PPN layer has regions 7 with a first orientation and regions 8 with a second orientation different from the first. Since the orientation is transmitted to the LCP layer before cross-linking thereof, the LCP layer has regions 9 with the first orientation and regions 10 with the second orientation.

Figure 5:
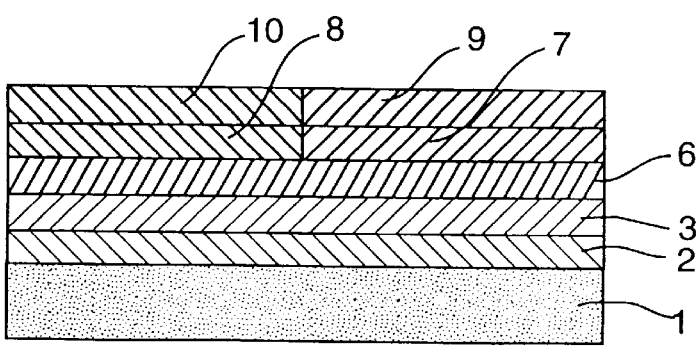
FIG. 5 shows another layer structure as in FIG. 4, but with an additional de-coupling layer.

Similarly, the layer structure shown in FIG. 5 corresponds to that of FIG. 3, i.e. with a decoupling layer, except that the upper PPN layer as before contains differently oriented regions 7 and 8 and the upper LCP layer contains regions 9 and 10 with correspondingly different orientation.

When a layer structure shown in FIGS. 1–5 and with two individually oriented LCP layers is used to produce a liquid crystal cell, the layer 3 can serve as a retarder and layer 5 or 9, 1 0 can serve as the orientating layer for the liquid crystal.

To obtain a retarder effect, the optical path difference of the LCP layer 3 is usually given a high value, i.e. above 100 nm.

Figure 6:
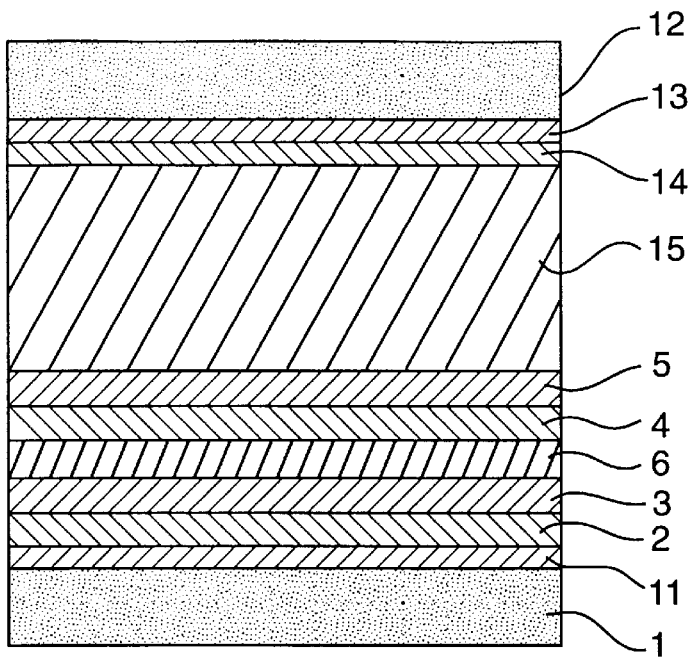
FIG. 6 shows a supertwisted nematic (STN) liquid crystal display cell with a layer structure according to FIG. 3.

FIG. 6 is a diagrammatic section through a liquid crystal cell constructed using a layer structure of this kind. A liquid crystal layer 15 lies between two glass plates 1 and 12 coated with a number of layers on their surfaces facing the liquid crystal. The plate 1 is firstly provided with an electrode layer 11, preferably of indium tin oxide (ITO) for applying a voltage. In order to avoid voltage drops across the polymer layers, the ITO layer 11 may alternatively be applied over the layer 3 or 6. In other respects the layer structure has the configuration shown in FIG. 3, i.e. two PPN-LCP combinations 2, 3 and 4, 5 with an alternately interposed de-coupling layer 6. The LCP layer 3 serves as a retarder, whereas the LCP layer 5 orients the liquid crystal 15. The substrate can also be provided with a reflective layer.

The other glass plate 12 is likewise coated with an ITO electrode layer 13 underneath an orientation layer 14, e.g. of unidirectionally ground PVA.

Figure 7:
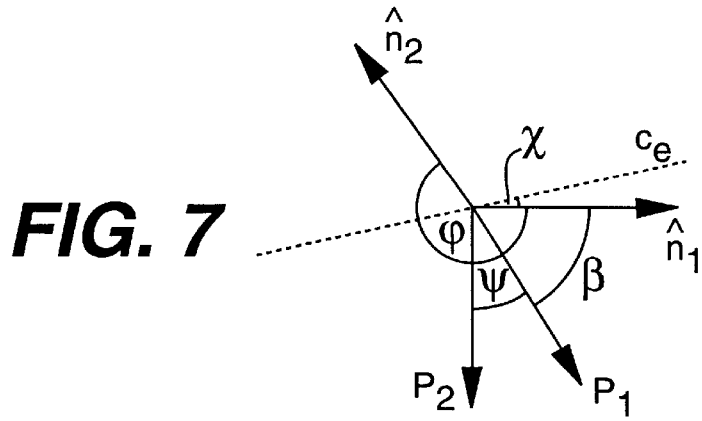
FIG. 7 shows a diagram of the directions of the nematic director, the optical retarder layer and the polarizers in the cell according to FIG. 6.
Figure 8:
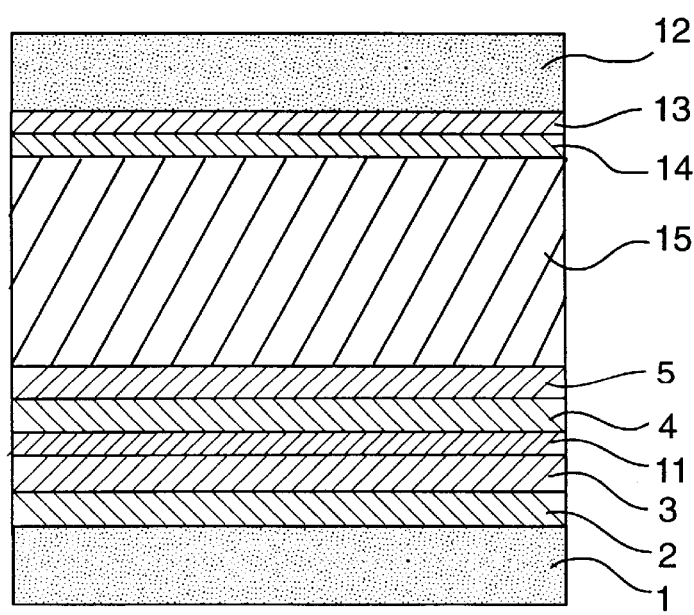
FIG. 8 shows an alternative liquid crystal cell with a layer structure according to FIG. 2, but with an additional ITO layer.

In order to obtain an STN cell with an angle of rotation $\phi=240°$, the orientation directions of the PVA layer 14 and of the top LCP layer 5 are at an angle of 60° to one another. The result, if the liquid crystal has suitable chiral doping, is a twist of 240° C. in the liquid crystal 15. FIG. 7 shows the arrangement of polarizers $P_1$ and $P_2$, the direction of the slow optical axis $c_e$ of the optical retarder 3, and the wall orientation directions $\hat{n}_1$ and $\hat{n}_2$ of the liquid crystal layer 15 adjacent the two orientation layers 5 and 14. $\hat{n}_1$ and $P_1$ are on the retarder side.

This cell is opaque when no voltage is applied, but becomes transparent when actuated with a suitable voltage. Because of the incorporated retarder 3, the usual interference colors in STN cells do not occur, i.e. the cell is white as regards optical visibility.

The retarder layer 3 can also consist of a liquid crystal mixed with chiral dopants. An angle of twist between 0° and 360° can be obtained by varying the concentration of dopant. The twisting can be levorotatory or dextrorotatory.

Twisted retarders of this kind are particularly suitable for color compensation of STN display cells. Preferably retarder layers with large optical path differences of $\Delta n.d\sim900$ nm are used for this purpose. When a twisted optical retarder is used in the STN cell of FIG. 6, the following conditions must be met:

The sense of rotation of the optical retarder is opposite to the sense of rotation of the liquid crystal layer 15, the angle of rotation ($\phi$) of the optical retarder being the same as that of the liquid crystal layer.

The slow optical axis of the optical retarder, on the side facing the liquid crystal, is at right angles to the orientation direction $\hat{n}1$ of the liquid crystal 15, and The optical path difference of the optical retarder is equal to the optical path difference of the liquid crystal layer 15.

Alternatively, a helically twisted retarder can be constructed if a multi-layer system of alternate successive orientation layers and LCP layers, optionally with interposition of de-coupling layers, is so constructed that the planar optical axes of the layers vary in azimuth, resulting in a helical structure.

Layers with high twist, serving as cholesteric optical filters, are obtained by increasing the concentration of chiral dopants in twisted retarder layers. Owing to the thermal stability of the layers, these filters can be used at temperatures far above 100° C. The wavelength of selective reflection of these cholesteric filters can be varied by varying the chiral dopants. The bandwidth of selective reflection of the filter combination can be varied by superposing at least two cholesteric layers, each with different selective reflection.

Retarder or orientation layers with an integrated linear polarizer, or absorptive optical filters, can be obtained by adding dichroic dyes, which are oriented by the liquid crystal molecules in the LCP layer.

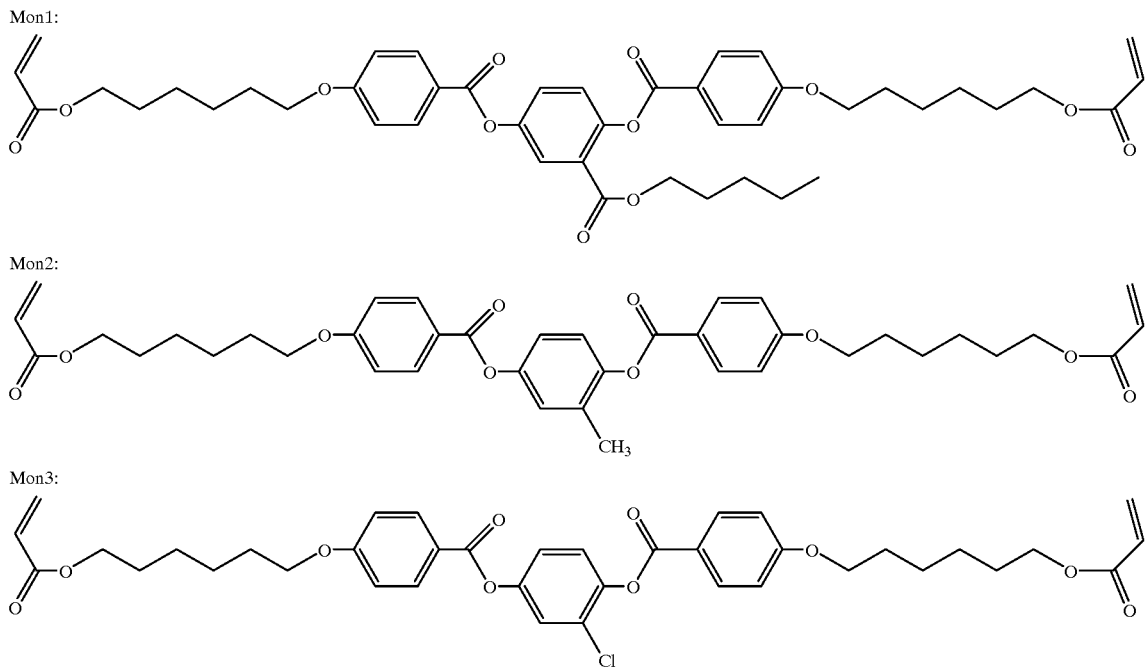

Mon1:

Mon2:

Mon3:

Other details are given in the following Examples.

EXAMPLE 1

Production of a PPN Layer

The PPN material can comprise, for example, cinnamic acid- derivatives. In the Examples, the chosen material was a PPN with a high glass point (Tg=133° C.).

Polymer:

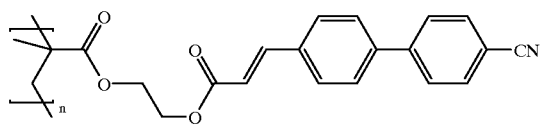

n=an integer

A glass plate was spin-coated with a 5% solution of the PPN material in NMP at 2000 rpm for 1 minute. The layer was then dried at 130° C. for 2 hours on a heating bench and for a further 4 hours at 130° C. in vacuo. The layer was then illuminated with the linear polarized light from a 200 W Hg very high pressure lamp at room temperature for 5 minutes. The layer could then be used as an orientating layer for liquid crystals. However, the thermal stability of the orientation capacity is too low for many applications. For example the orientation capacity disappeared e.g. after 15 minutes at 120° C.

EXAMPLE 2

Mixture of Cross-Linkable LC Monomers for the LCP Layers

The following diacrylate components were used as cross-linkable LC monomers in the Examples:

These components were used to develop a super-coolable nematic mixture $M_{LCP}$ having a particularly low melting point (Tm~35° C.), such that the LCP layer could be prepared at room temperature.

The diacrylate monomers were present in the mixture in the following proportions:

| Mon 1 | 80% |
| Mon 2 | 15% |
| Mon 3 | 5% |

2% of Ciba-Geigy IRGACURE 369 photoinitiator was added to the mixture.

The $M_{LCP}$ mixture was then dissolved in anisole. The thickness of the LCP layer can be adjusted over a wide range by varying the concentration of $M_{LCP}$ in anisole.

For photo-induced cross-linking of the LC monomers, the layers, after orientation, were irradiated with isotropic light from a 150 W xenon lamp for about 30 minutes, thus fixing the orientation.

EXAMPLE 3

Combination of Retarder and Orientation Layer

A PPN-coated glass plate was irradiated with polarized UV light for 5 minutes. A 40% solution of $M_{LCP}$ in anisole was deposited by centrifuging on to the illuminated layer. Spin parameter: 2 minutes at 2000 rpm. The resulting cross-linkable LCP layer was orientated in accordance with the direction of polarization of the UV light. After cross-linking the LCP layer had a thickness of 2.2 μm.

If the coated glass plate is disposed under crossed polarizers so that the polarizers are parallel or at right angles to the direction of polarization during illumination of the PPN layer, the plate is dark. If, however, the plate is rotated through 45° in the plate plane, the plate becomes light, i.e. it has double refraction. The optical delay is about 300 nm.

An isotropic $SiO_x$ de-coupling layer 50 nm thick was deposited by sputtering on to the hybrid layer with an optical delay of 300 nm. A PPN layer was then constructed on the de-coupling layer as described in Example 1. The PPN layer was divided into two regions illuminated in different directions of polarization, the direction of polarization of the light in one half being parallel to and in the other half at right angles to the optical axis of the underlying retarder layer. One half was covered during illumination of the other half. The result was two regions with directions of planar orientation at right angles to one another.

A 5% solution of $M_{LCP}$ in anisole was prepared. The solution was deposited by centrifuging on to the locally variously illuminated PPN layer. Spin parameter: 2 minutes at 2000 rpm. In order to optimize the orientation of the LC monomers, the coated substrate was then heated to just above the clearing point ($T_c$=67° C.). The layer was then cooled at 0.1° C./min to a few degrees below the clearing point and then photochemically cross-linked.

If this hybrid substrate and a second ground PVA-coated substrate are used to construct an LC cell and the cell is filled with a liquid crystal, the result is a twisted cell (TN) configuration in one half of the cell and a homogeneous planar arrangement of the LC molecules in the other half. The hybrid substrate serves on the one hand as an optical retarder and on the other hand as an orientation layer for the liquid crystal. The optical axis of the retarder can be different from the direction in which the LC molecules are oriented.

The multilayer layer is thermally and optically stable, as a result of the two cross-linked LCP layers. In place of the $SiO_x$ layer, isotropic decoupling layers of nylon were made. To this end, 0.1% nylon was dissolved in trifluoroethanol and deposited by spin-coating on to the first LCP layer.

EXAMPLE 4

STN Cell Compensated in Situ and with Uniaxial Retarder

A PPN layer was applied to an ITO-coated glass plate and irradiated with linear-polarized light. Next, a 53% solution of $M_{LCP}$ in anisole was deposited by centrifugation and cross-linked (spin parameter: 2 minutes at 2000 rpm). The optical delay of this retarder layer was 530 nm. As in Example 3, a second PPN layer was applied, de-coupled from the retarder by an isotropic SiO2 layer. The direction of the polarizer for illuminating the second PPN layer was rotated through 75° relatively to the direction of polarization of illumination of PPN1. A thin LCP layer was deposited on the PPN2 layer after illumination, as in Example 3.

This substrate and a second, rubbed PVA-ITO glass substrate were used to construct an LC cell with a plate separation of d=5 μm. The second plate was disposed so that the angle between its direction of rubbing and the direction of orientation of the hybrid layer was 240°. The transmission directions of the two polarizers required were adjusted as in FIG. 7. A liquid crystal mixture was first doped with a chiral dopant so as to obtain a d/p ratio of 0.51 (p=pitch). This mixture was poured into the LC cell.

As long as no voltage is applied to the cell, it appears dark. If, however, a sufficient voltage is applied, the cell changes from black to white. The normal interference colors in STN cells are thus compensated by the retarder layer, avoiding the need for an externally applied compensation foil.

EXAMPLE 5

Hybrid Layer as Twisted Retarder

The $M_{LCP}$ mixture was doped with 0.16% of a levorotatory chiral dopant with a high twisting power [helical twisting power (HTP)=0.26 $\mu m^{-1}$]. The doped mixture was then dissolved to a 40% in anisole and centrifugally applied to an illuminated PPN layer (2 minutes at 2000 rpm). After cross-linking, the thickness of the LCP layer was about 2.2 μm. When the coated plate is observed under crossed polarizers, the direction of transmission on the substrate side being parallel to the direction of polarization of the light illuminating the PPN, the layer does not appear dark as would be the case with a linear retarder. However, the layer is darkest when the analyzer is rotated through 30°. Accordingly, the plane of polarization of the linear polarized light is rotated through 30° in transit through the retarder, corresponding to the twist in the LCP layer.

The twist can be adjusted between 0° and 360° by varying the concentration of the chiral dopant. A dextrorotatory chiral dopant can be used instead of a levorotatory dopant. These twisted retarders are also of interest e.g. for color compensation of STN displays.

EXAMPLE 6

STN Cell Compensated in Situ and with Twisted Retarder

Instead of a linear retarder, the first PPN-LCP layer combination can be a twisted retarder, thus further increasing the contrast. Consequently, the $M_{LCP}$ mixture for the first LCP layer was doped with a dextrorotatory chiral dopant. The spin parameters were so chosen that the optical delay of the LCP layer was equal to that of the liquid crystal 15 in FIG. 6. The pitch of the LCP layer could then be adjusted via the concentration of dopant such that the angle of rotation of the retarder was equal to the angle of rotation of the liquid crystal. The orientation layer above the twisted retarder was illuminated such that its direction of orientation was at right angles to the slow axis of the retarder on the side facing the orientating layer. In a similar manner to Example 4, this substrate was used to construct an STN cell and filled with a levorotatory liquid crystal.

EXAMPLE 7

Hybrid Layers with Locally Different Colors

A 50% solution of $M_{LCP}$ in anisole was applied by centrifugation at room temperature on to a PPN layer irradiated with linear polarized light, and was cross-linked. The resulting optical retarder had a delay of 470 nm. Under cross-polarizers, the plate was orange-colored. As in Example 3, a 50 nm thick isotropic de-coupling layer of $SiO_x$ was deposited by sputtering, followed by a second PPN layer. Layer PPN2 was then divided into three regions, which were illuminated with different directions of polarization. The directions of polarization were parallel in region 1, perpendicular in region 2 and 45° to the direction of polarization of the illumination of PPN1 in region 3. During illumination of each region the other regions were covered.

A 30% solution of $M_{LCP}$ in anisole was applied by centrifuging on to the thus-illuminated, PPN2 layer and cross-linked. The resulting LCP layer had an optical delay of $\Delta nd=140$ nm.

If the hybrid layer was disposed under cross-polarizers in such a manner that the direction of polarization of PPN1 illumination lay at 45° to the polarizers, three colors were recognized:

| Region | $\Delta nd$ [nm] | Color |
|--------|------------------|--------|
| 1 | 610 | Blue |
| 2 | 330 | Yellow |
| 3 | 470 | Orange |

The optical delays of the two LCP layers are added in region 1 and subtracted in region 2.

Other colors can be produced by applying further PPN-LCP combinations in an analogous manner to each of these three colors. The illumination of the individual layers can also be effected by varying the polarization directions with angles between 0° and 90° compared with the first illumination. Thereby, Lyot/Oehman or Solc interference filters can also be realized, the transmission range of which being adjustable by the number of layers, their thickness and the direction of their optical axes. The transmission range can be variously adjusted pixel-wise by the structuring.

EXAMPLE 8

Cholesteric LCP Layer for Optical Filters/Polarizers (Circular Polarizers)

The $M_{LCP}$ mixture was doped with 12% of the chiral levorotatory dopant in Example 5. The resulting cholesteric mixture had a pitch of about 360 nm. The doped mixture was dissolved to 40% in anisole, applied centrifugally to a PPN layer illuminated with linear polarized light and cross-linked. The resulting layer acted as a cholesteric filter with a selective reflected wavelength of $\lambda o=580$ nm. The width of the reflection bands was 70 nm.

EXAMPLE 9

Dichroic LCP Layers as Linear Polarizers

2% of a dichroic dye with the following structure:

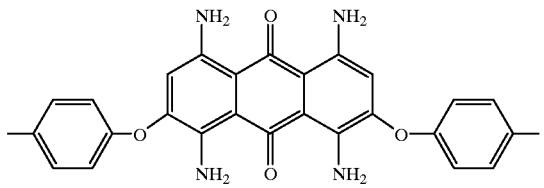

were added to the $M_{LCP}$ mixture. This mixture was dissolved to 30% in anisole, centrifugally applied to a PPN layer illuminated with linear polarized light and cross-linked. If a polarizer was held with its transmission direction parallel or perpendicular to the direction of polarization of the PPN illumination, the white light was transmitted in one case, but at right angles thereto the layer was colored depending on the absorption spectrum of the dye. The dichroic ratio was 8:1. If in place of this a black mixture of dichroic dye molecules is used, the hybrid layer serves as a wide-band polarizer. As a result of the local irradiation of the PPN layer with different directions of, linear polarizing layers can be produced with azimuthally varying directions of polarization. These can be used in LC displays, e.g. in conjunction with the structured retarders and orientating layers in the Examples hereinbefore.

Upon reading the present specification, various alternative embodiments will become obvious to those skilled in the art. These embodiments are to be considered within the scope and spirit of the invention which is only to be limited by the claims which follow and their equivalents.

What is claimed is:

1. A process for making an anisotropic layer of cross-linked liquid crystalline monomers in contact with an orientating layer on a single substrate, which comprises providing one and only one substrate, applying an orientating layer onto the single substrate, then applying a layer of a non-cross-linked liquid crystalline monomer, and subsequently cross-linking the monomer.

2. The process according to claim 1 further comprising applying a second orientating layer to the liquid crystalline monomer layer.

3. The process according to claim 2 further comprising applying a second layer of non-cross-linked liquid crystalline monomer to the second orientating layer, and subsequently cross- linking the second monomer.

4. A process as claimed in claim 1, wherein the orientation layer is made from a photo-orientable material.

* * * * *

UNITED STATES PATENT AND TRADEMARK OFFICE
CERTIFICATE OF CORRECTION

PATENT NO. : 6,160,597
DATED : December 12, 2000
INVENTOR(S) : Schadt et al.

Page 1 of 1

It is certified that error appears in the above-identified patent and that said Letters Patent is hereby corrected as shown below:

Title page,
Item [30], add the following Foreign Application Priority Data:
-- Feb. 17, 1993 [CH]   Switzerland ............ 488/93 --
Item [63], delete the existing information and replace it with the following:
-- Continuation of application no. 08/489,865, June 13, 1995, and continuation-in-part of application no. 08/194,234, Feb. 10, 1994, Pat. No. 5,602,661. --

Column 1,
Lines 4-6, delete the existing paragraph and replace it with the following paragraph:
-- This application is a continuation of application no. 08/489,865, filed on June 13, 1995, and is also a continuation-in-part of application no. 08/194,234, filed on February 10, 1994, now U.S. Patent No. 5,602,661. --

Signed and Sealed this

Thirtieth Day of April, 2002

Attest:

Attesting Officer

JAMES E. ROGAN
*Director of the United States Patent and Trademark Office*